(12) United States Patent
Chernov et al.

(10) Patent No.: US 10,252,197 B2
(45) Date of Patent: Apr. 9, 2019

(54) FILTER ASSEMBLY

(71) Applicant: Haier US Appliance Solutions, Inc., Wilmington, DE (US)

(72) Inventors: Gregory Sergeevich Chernov, Louisville, KY (US); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 102 days.

(21) Appl. No.: 15/374,320

(22) Filed: Dec. 9, 2016

(65) Prior Publication Data
US 2018/0161711 A1 Jun. 14, 2018

(51) Int. Cl.
| | | |
|---|---|---|
| *B01D 35/30* | (2006.01) | |
| *B01D 35/04* | (2006.01) | |
| *C02F 1/00* | (2006.01) | |
| *B01D 27/08* | (2006.01) | |
| *B05B 15/40* | (2018.01) | |
| *B05B 1/18* | (2006.01) | |

(52) U.S. Cl.
CPC .......... *B01D 35/306* (2013.01); *B01D 27/08* (2013.01); *B01D 35/04* (2013.01); *C02F 1/001* (2013.01); *B01D 2201/0461* (2013.01); *B01D 2201/29* (2013.01); *B01D 2201/4061* (2013.01); *B05B 1/18* (2013.01); *B05B 15/40* (2018.02); *C02F 2201/006* (2013.01); *C02F 2307/06* (2013.01)

(58) Field of Classification Search
None
See application file for complete search history.

(56) References Cited

U.S. PATENT DOCUMENTS

| | | | |
|---|---|---|---|
| 8,097,156 B2 | 1/2012 | Tubby et al. | |
| 9,067,154 B1 | 6/2015 | Branscomb et al. | |
| 9,233,322 B1 | 1/2016 | Huda et al. | |
| 2008/0047889 A1* | 2/2008 | Huda | B01D 35/30 |
| | | | 210/234 |
| 2011/0174705 A1* | 7/2011 | Branscomb | B01D 35/153 |
| | | | 210/153 |
| 2016/0271537 A1* | 9/2016 | Joung | H02J 7/0016 |

\* cited by examiner

*Primary Examiner* — Benjamin M Kurtz
(74) *Attorney, Agent, or Firm* — Dority & Manning, P.A.

(57) ABSTRACT

A filter assembly includes a manifold with a base and a support ring. The support ring is received within the base such that the support ring is rotatable relative to the base. A housing of the filter cartridge has an interface positioned at an outer surface of the housing. The interface is configured to engage with a post of the support ring in order to mount the filter cartridge to the manifold.

19 Claims, 5 Drawing Sheets

FILTER ASSEMBLY

FIELD OF THE INVENTION

The present subject matter relates generally to filter assemblies, such as filter assemblies for appliances or plumbing fixtures.

BACKGROUND OF THE INVENTION

Certain appliances include water filter assemblies for filtering water. Water filter assemblies can filter water entering the appliances in order to provide filtered water to various appliance components, such as an ice maker and/or a water dispenser. Such filtering can improve a taste and/or an appearance of water within the appliances. Filter assemblies are also used as point-of-use or point-of-entry water filters.

Water filter assemblies generally include a manifold and a filter cartridge. The manifold is mounted to a fixed structure and directs unfiltered water into the filter cartridge and filtered water out of the filter cartridge. The filter cartridge includes a filter medium, such as an activated carbon block, a pleated polymer sheet, a spun cord material, a melt blown material, a chemical agent, etc. The filter medium is positioned within the filter cartridge and filters water passing therethrough.

Over time, the filter medium will lose effectiveness. For example, pores of the filter medium can become clogged or the filter medium can become saturated with contaminants. To ensure that the filter medium has not exceeded its filtering capacity, the filter cartridge or the filtering medium is preferably replaced or serviced at regular intervals regardless of its current performance.

However, mounting and removing the filter cartridge can be a rather difficult task. For example, current filter cartridges are frequently mounted and removed from an associated manifold by rotating the filter cartridge relative to the manifold. Thus, a portion of the filter cartridge must be accessible to a user in order to allow the user to grasp and manually rotate the filter cartridge relative to the manifold. Such exposed portions of the filter cartridge can be unaesthetic. As another example, certain filter cartridges are threaded to an associated manifold, and the treads must be carefully meshed in order to avoid striping the treads.

Accordingly, a filter assembly with features for quickly and easily mounting a filter cartridge to a manifold would be useful. In addition, a filter assembly with features for flush mounting a filter cartridge would be useful.

BRIEF DESCRIPTION OF THE INVENTION

The present subject matter provides a filter assembly that includes a manifold and a filter cartridge. The manifold has a support ring rotatably mounted with a base of the manifold. A housing of the filter cartridge has an interface positioned at an outer surface of the housing. The interface is configured to engage with a post of the support ring in order to mount the filter cartridge to the manifold. The filter cartridge may be pushed into the manifold to mount the filter cartridge to the manifold. Additional aspects and advantages of the invention will be set forth in part in the following description, or may be apparent from the description, or may be learned through practice of the invention.

In a first exemplary embodiment, a filter assembly is provided. The filter assembly includes a manifold with a base and a support ring. The support ring is received within the base. The support ring has a plurality of posts. The posts of the plurality of posts are spaced apart from one another on the support ring. A filter cartridge is mountable to the manifold and defines an axial direction and a circumferential direction. The filter cartridge includes a housing. The housing has a plurality of interfaces positioned at an outer surface of the housing. Each interface of the plurality of interfaces is configured to engage with a respective one of the plurality of posts in order to mount the filter cartridge to the manifold. Each interface of the plurality of interfaces has a sloped inlet surface and a cupped support surface. The sloped inlet surface and the cupped support surface face each other along the axial direction. A first portion of the sloped inlet surface is offset from the cupped support surface along the circumferential direction. A second portion of the sloped inlet surface is aligned with the cupped support surface along the circumferential direction. Each post of the plurality of posts is positioned on a respective cupped support surface of the plurality of interfaces when the filter cartridge is mounted to the manifold.

In a second exemplary embodiment, a filter assembly is provided. The filter assembly includes a manifold with a base and a support ring. The support ring is received within the base. The support ring has a post. A filter cartridge is mountable to the manifold and defines an axial direction and a circumferential direction. The filter cartridge includes a housing. The housing has an interface positioned at an outer surface of the housing. The interface is configured to engage with the post in order to mount the filter cartridge to the manifold. The interface has a sloped inlet surface and a cupped support surface. The sloped inlet surface and the cupped support surface face each other along the axial direction. A first portion of the sloped inlet surface is offset from the cupped support surface along the circumferential direction. A second portion of the sloped inlet surface is aligned with the cupped support surface along the circumferential direction. The sloped inlet surface is positioned and oriented for guiding the post to the cupped support surface as the filter cartridge is mounted to the manifold. The post is positioned on the cupped support surface when the filter cartridge is mounted to the manifold.

In a fourth exemplary embodiment, a filter assembly defines an axial direction and a circumferential direction. The filter assembly includes a manifold with a base and a support ring. The support ring is received within the base. A filter cartridge has a housing. The filter cartridge is mountable to the manifold at a connection between the filter cartridge and the manifold, the connection between the filter cartridge and the manifold comprising a post and an interface, the post positioned on one of the support ring or the housing of the filter cartridge, the interface positioned on the other of the support ring or the housing of the filter cartridge, the interface configured to engage with the post in order to mount the filter cartridge to the manifold, the interface having a sloped inlet surface and a cupped support surface, the sloped inlet surface and the cupped support surface facing each other along the axial direction, a first portion of the sloped inlet surface offset from the cupped support surface along the circumferential direction, a second portion of the sloped inlet surface aligned with the cupped support surface along the circumferential direction, the sloped inlet surface positioned and oriented for guiding the post to the cupped support surface as the filter cartridge is mounted to the manifold, the post positioned on the cupped support surface when the filter cartridge is mounted to the manifold.

In a fourth exemplary embodiment, a filter cartridge is provided. The filter cartridge is mountable to a manifold.

The filter cartridge defines an axial direction and a circumferential direction. The filter cartridge includes a housing that extends between a first end portion and a second end portion along the axial direction. A plurality of interfaces is formed at an outer surface of the housing adjacent the first end portion of the housing. Each interface of the plurality of interfaces has a sloped inlet surface and a cupped support surface. The sloped inlet surface faces the first end portion of the housing. The cupped support surface faces the second end portion of the housing. A first portion of the sloped inlet surface is offset from the cupped support surface along the circumferential direction. A second portion of the sloped inlet surface is aligned with the cupped support surface along the circumferential direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
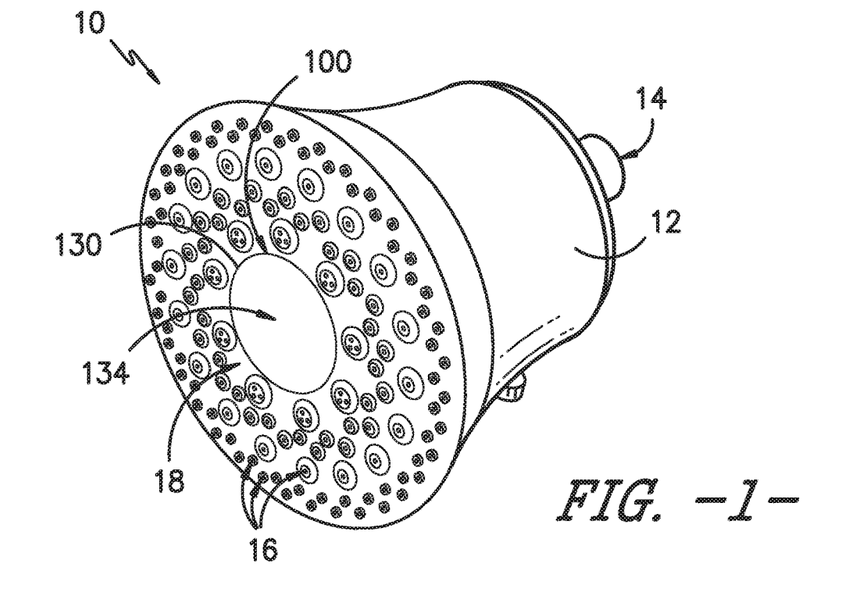
FIG. 1 provides a perspective view of a shower head according to an exemplary embodiment of the present subject matter.

FIG. 1 provides a perspective view of a shower head 10 according to an exemplary embodiment of the present subject matter. As may be seen in FIG. 1, shower head 10 includes a head body 12. Head body 12 defines an inlet 14 and a plurality of outlets 16. Head body 12 may be mounted to a pipe or conduit that directs water from a water supply (not shown), such as a municipal water supply or well, into head body 12 via inlet 14. As an example, head body 12 may be threaded onto the pipe at inlet 14. The water may flow from inlet 14 through head body 12 to outlets 16. At outlet 16, the flow of water may exit head body 12 onto a user within a shower.

As may be seen in FIG. 1, shower head 10 also includes a filter assembly 100 that filters water flowing through head body 12 between inlet 14 and outlets 16. Filter assembly 100 is disposed within head body 12. For example, head body 12 has an outer surface 18, e.g., at or adjacent outlets 16. A filter cartridge 130 of filter assembly 100 may be received within head body 12 such that an outer surface 134 of filter cartridge 130 is flush with outer surface 18 of head body 12. Thus, shower head 10 may have a pleasant cosmetic appearance.

It should be understood that while described in the context of shower head 10, filter assembly 100 may be used to filter water in any other suitable location in alternative exemplary embodiments. For example, filter assembly 100 may be used in or with an appliance, such as a refrigerator appliance, or in another plumbing fixture, such as a faucet. In various exemplary embodiments, filter assembly 100 may be configured as a point-of-use filter or a point-of-entry filter. Thus, it should be understood that filter assembly 100 is not limited to use in any particular location, such as shower heads or other plumbing fixtures. Components of filter assembly 100 and operation of filter assembly 100 are discussed in greater detail below in the context of FIGS. 2 through 7.

Figure 2:
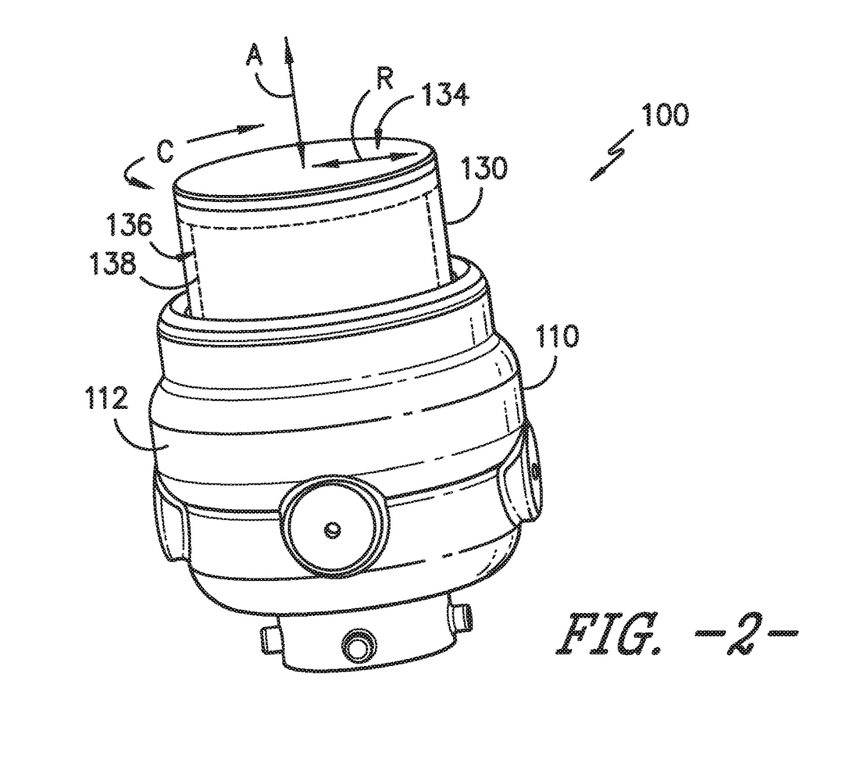
FIG. 2 provides a perspective view of a filter assembly of the exemplary shower head of FIG. 1.

FIG. 2 provides a perspective view of filter assembly 100. As may be seen in FIG. 2, filter assembly 100 includes a manifold 110 and a filter cartridge 130. Manifold 110 may be positioned within and/or mounted to head body 12. Filter cartridge 130 is mountable to manifold 110. Thus, a user may selectively mount filter cartridge 130 to manifold 110 and selectively remove filter cartridge 130 from manifold 110, e.g., to allow the user to replace filter cartridge 130 or otherwise service filter assembly 100 or shower head 10.

Figure 3:
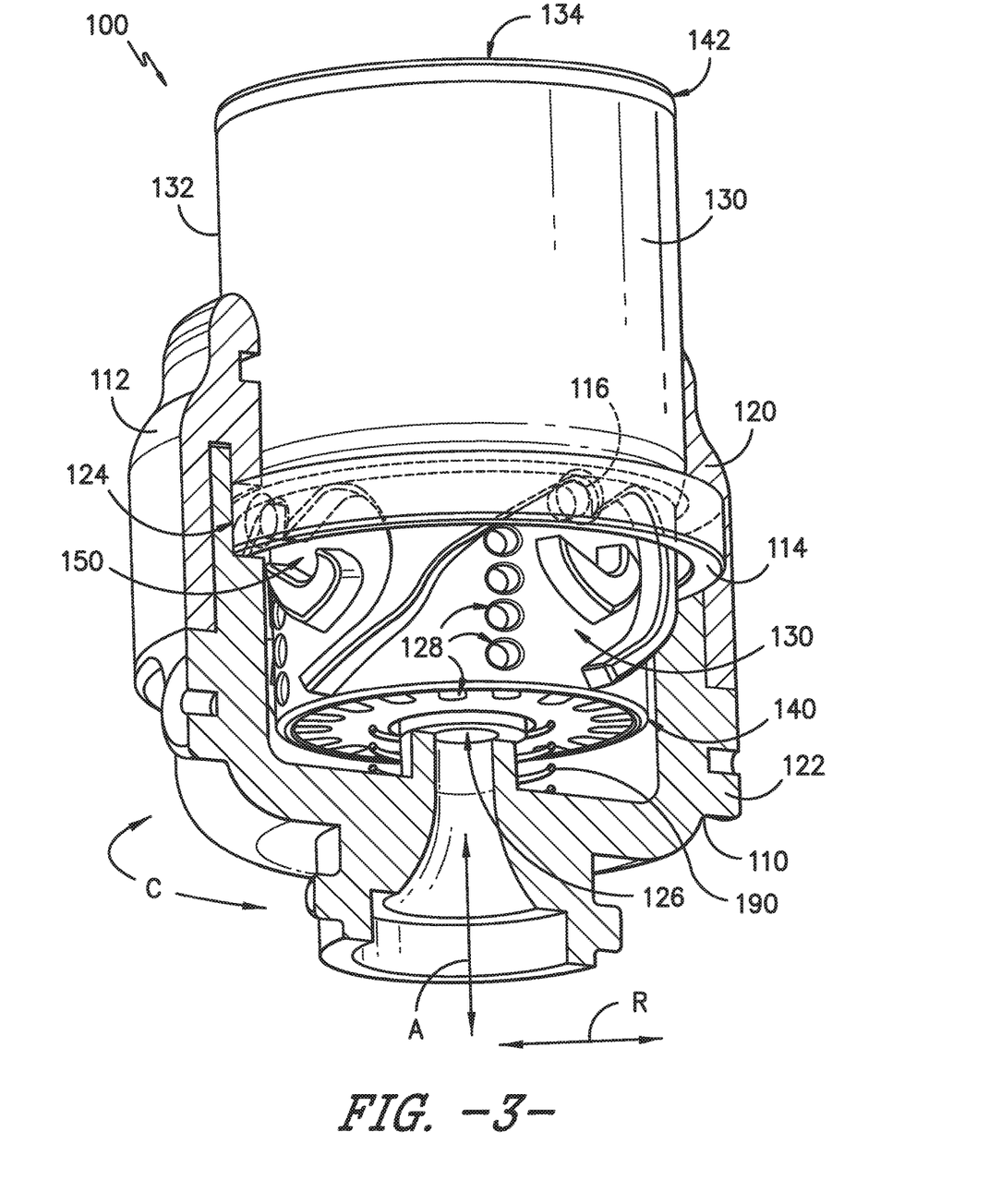
FIG. 3 provides a section view of the exemplary filter assembly of FIG. 2.

FIG. 3 provides a section view of filter assembly 100. As may be seen in FIG. 3, manifold 110 includes a base 112 and a support ring 114. Support ring 114 is received within base 112. In particular, support ring 114 is arranged within base 112 such that support ring 114 is rotatable relative to base 112. Thus, e.g., support ring 114 may rotate relative to base 112 as filter cartridge 130 is mounted to or removed from manifold 110, as discussed in greater detail below. In alternative exemplary embodiments, support ring 114 is arranged within base 112 such that support ring 114 is fixed relative to base 112. In particular, base 112 and support ring 114 may be integrally formed of or with a seamless piece of material, such as molded plastic. Thus, support ring 114 need not be a separate material or component from base 112 in certain exemplary embodiments.

Support ring 114 may be annular and extend along a circumferential direction C. In certain exemplary embodiments, support ring 114 may have an internal diameter that is larger than an outer diameter of filter cartridge 130 such that filter cartridge 130 may be received within support ring 114 when filter cartridge 130 is mounted to manifold 110. Support ring 114 also has a plurality of posts 116. Posts 116 extend inwardly, e.g., along a radial direction R, from support ring 114 towards filter cartridge 130 when filter cartridge 130 is mounted to manifold 110. Posts 116 are spaced apart from one another on support ring 114. For example, posts 116 may be uniformly spaced apart from one another, e.g., along the circumferential direction C, on support ring 114.

Support ring 114 may be mounted to base 112 in any suitable manner. For example, base 112 may include a first base section 120 and a second base section 122. First base section 120 is mounted to second base section 122 such that first and second base sections 120, 122 define an annular space 124 therebetween. Support ring 114 may be received within annular space 124, and support ring 114 may be rotatable within annular space 124 relative to base 112.

Filter cartridge 130 includes a housing 132 that has an inlet 126 and a plurality of outlets 128. Referring now to FIGS. 2 and 3, housing 132 is hollow and defines an internal volume 136. A filter medium 138, such as a carbon block, polymer membrane, reverse-osmosis membrane, a chemical treatment block, etc., is disposed within internal volume 136. Unfiltered water from manifold 110 enters housing 132 at inlet 126 of housing 132, and the water or a portion of the water then passes through filter medium 138. From filter medium 138, filtered water exits housing 132 at outlets 128 of housing 132, e.g., and flows to outlets 16 of shower head 10. Thus, filter medium 138 is disposed between inlet 126 and outlets 128 of housing 132 such that water flowing between inlet 126 and outlets 128 of housing 132 is filtered or treated with filter medium 138.

Figure 4:
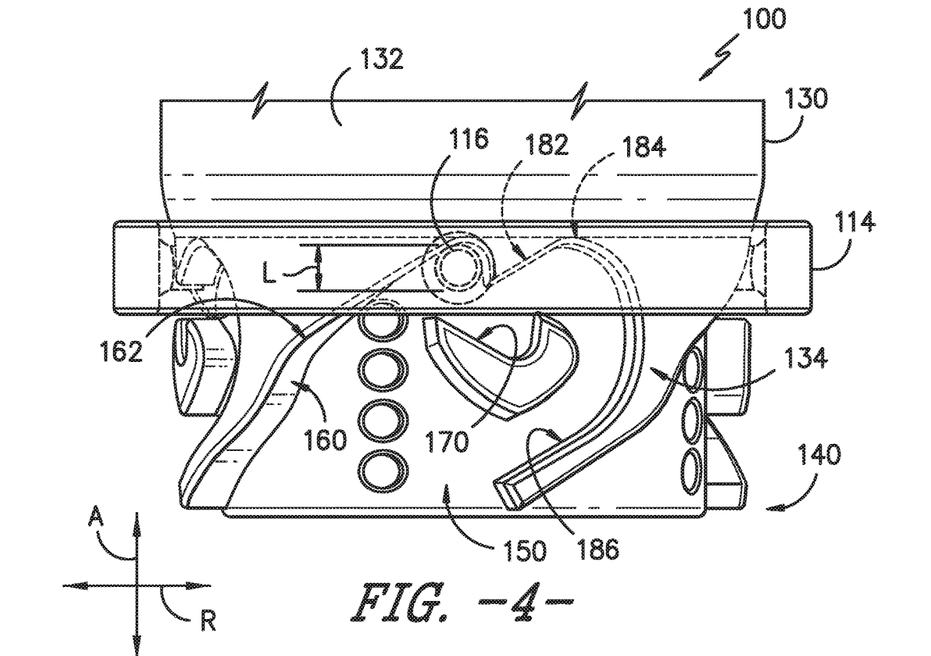
FIGS. 4 and 5 provide partial, plan views of certain components of the exemplary filter assembly of FIG. 2.
Figure 5:
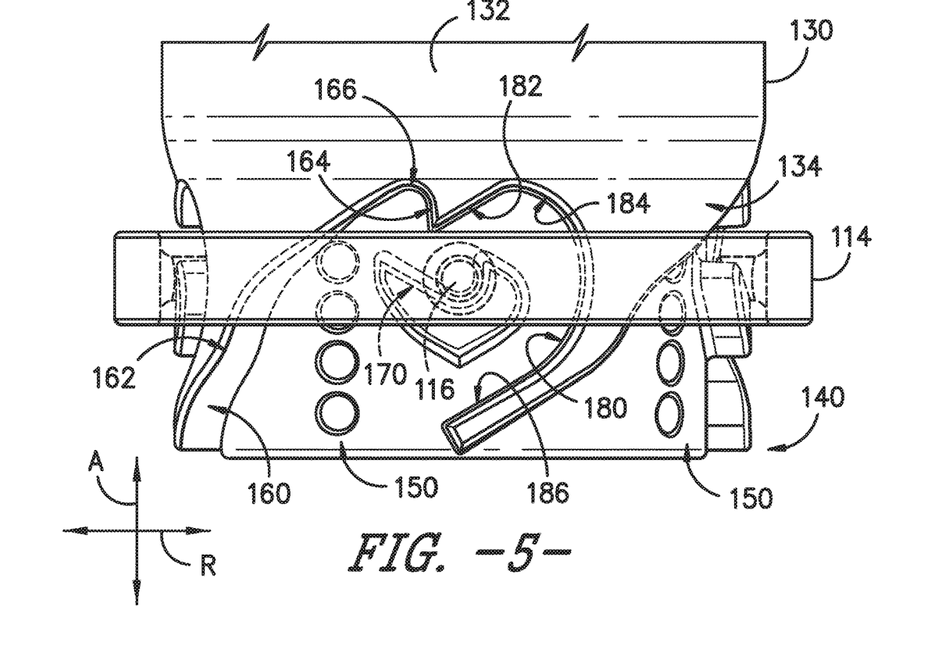
Figure 6:
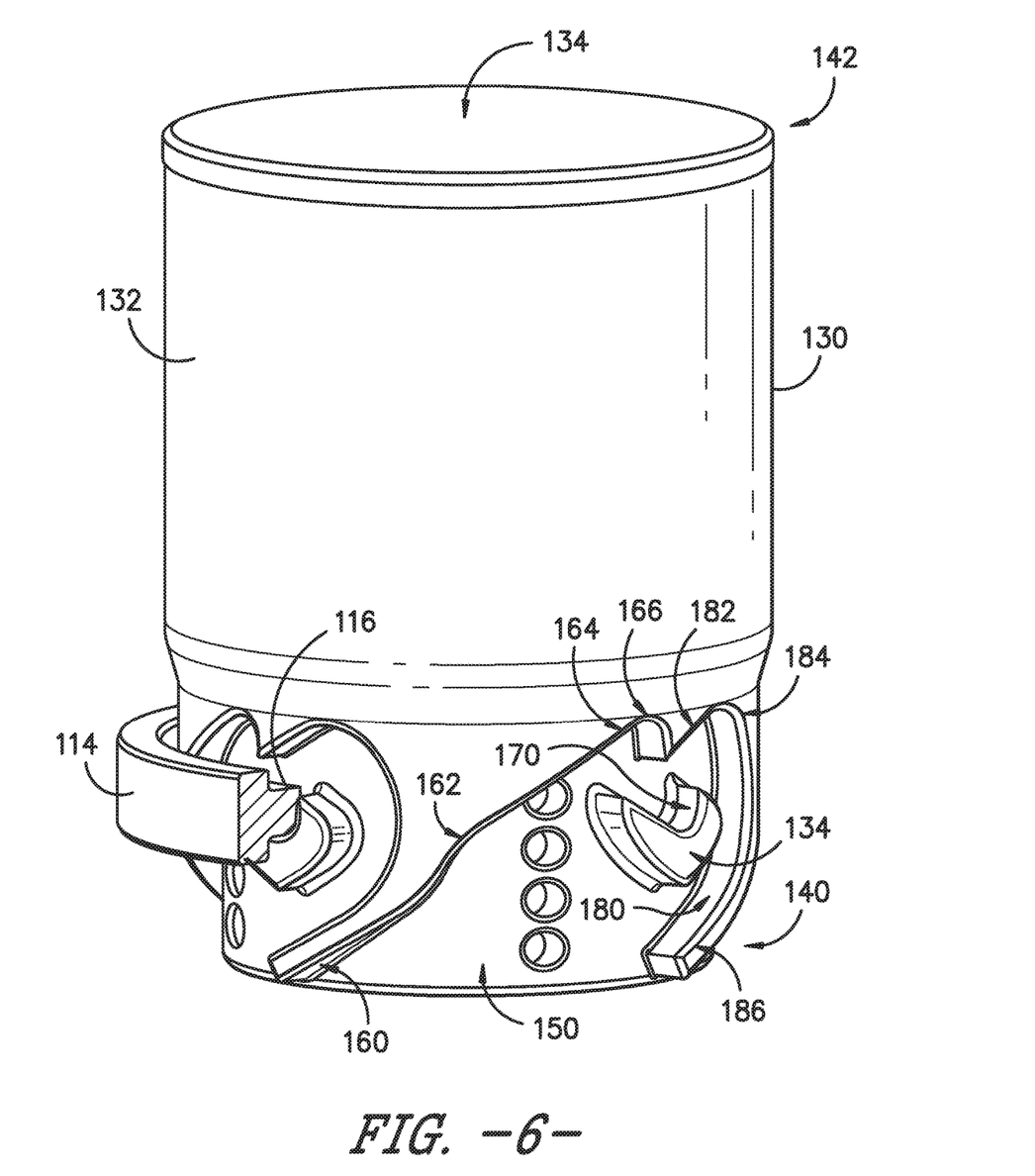
FIG. 6 provides a perspective view of the components of the exemplary filter assembly of FIG. 5.

FIGS. 4 and 5 provide partial, plan views of certain components of filter assembly 100. FIG. 6 provides a perspective view of the components of filter assembly 100. As may be seen in FIGS. 4 through 6, housing 132 includes a plurality of interfaces 150. Interfaces 150 are positioned at outer surface 134 of housing 132, e.g., inset within outer surface 134 of housing 132 along the radial direction R. In particular, housing 132 may be generally cylindrical and extend between a first end portion 140 and a second end portion 142, e.g., along an axial direction. Interfaces 150 may be positioned adjacent or proximate first end portion 140 of housing 132. Each interface of interfaces 150 is configured to engage with a respective one of posts 116 on support ring 114 in order to mount filter cartridge 130 to manifold 110, as discussed in greater detail below. The illustrated exemplary filter assembly 100 has four discrete interfaces 150. However, it should be understood that filter assembly 100 may have any other suitable number of interfaces 150 in alternative exemplary embodiments, e.g., one interface, two interfaces, three interfaces, five interfaces, etc.

Each interface of interfaces 150 has a sloped inlet surface 160 and a cupped support surface 170. Sloped inlet surface 160 and cupped support surface 170 face each other, e.g., along the axial direction A. For example, sloped inlet surface 160 may face towards first end portion 140 of housing 132, and cupped support surface 170 may face towards second end portion 142 of housing 132. The position and/or orientation of sloped inlet surface 160 and cupped support surface 170 relative to each other may assist with selectively mounting filter cartridge 130 to manifold 110.

As shown in FIGS. 4 and 5, sloped inlet surface 160 has or extends between a first portion 162 and a second portion 164. First portion 162 of sloped inlet surface 160 is offset from cupped support surface 170, e.g., along the circumferential direction C. Conversely, second portion 164 of sloped inlet surface 160 is aligned with cupped support surface 170, e.g., along the circumferential direction C. Thus, second portion 164 of sloped inlet surface 160 and cupped support surface 170 may directly face each other, e.g., along the axial direction A. Post 116 may also have a length L, e.g., along the axial direction A and/or circumferential direction C. Second portion 164 of sloped inlet surface 160 may be spaced apart from cupped support surface 170, e.g., along the axial direction A and/or circumferential direction C, by no less than the length L of post 116 in order to allow post 116 to slide or move between second portion 164 of sloped inlet surface 160 and cupped support surface 170.

Second portion 164 of sloped inlet surface 160 may include a cupped stop portion 166. Cupped stop portion 166 may correspond to a portion of sloped inlet surface 160 that is most remote or furthest from first end portion 140 of housing 132, e.g., along the axial direction A. Cupped stop portion 166 may also be shaped to receive and/or be complementary to post 116. Likewise, cupped support surface 170 may be shaped to receive and/or be complementary to post 116.

Each interface of interfaces 150 may also have a sloped outlet surface 180. Sloped outlet surface 180 may have or extend between a first portion 182, a second portion 184 and a third portion 186. In particular, second portion 184 of sloped outlet surface 180 may extend between and connect first and third portions 182, 186 of sloped outlet surface 180.

First portion 182 of sloped outlet surface 180 is aligned with cupped support surface 170, e.g., along the circumferential direction C. Thus, first portion 182 of sloped outlet surface 180 and cupped support surface 170 may directly face each other, e.g., along the axial direction A. Second portion 184 of sloped outlet surface 180 may be offset from cupped support surface 170, e.g., along the circumferential direction C. Second portion 184 of sloped outlet surface 180 may correspond to a portion of sloped outlet surface 180 that is most remote or furthest from first end portion 140 of housing 132, e.g., along the axial direction A. Second portion 184 of sloped outlet surface 180 may also be shaped to receive and/or be complementary to post 116. Third portion 186 of sloped outlet surface 180 may be aligned with cupped support surface 170, e.g., along the axial direction A. Third portion 186 of sloped outlet surface 180 may also be angled or oriented parallel to first portion 162 of sloped inlet surface 160.

Figure 7:
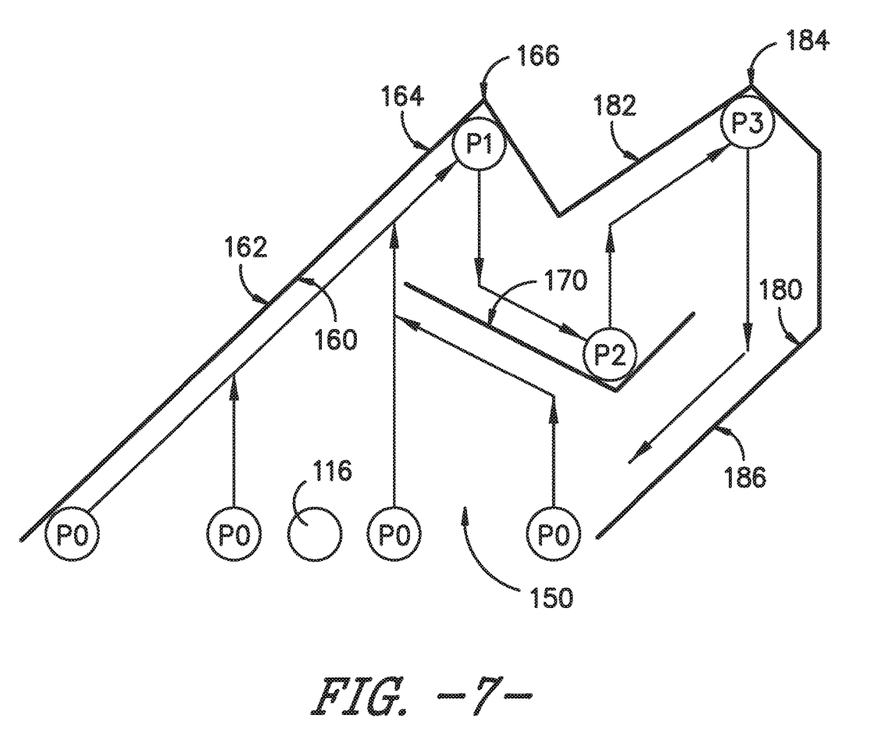
FIG. 7 provides a schematic view of a connection between a manifold and a filter cartridge of the exemplary filter assembly of FIG. 2.

FIG. 7 provides a schematic view of a connection between manifold 110 and filter cartridge 130 during various stages of mounting filter cartridge 130 to manifold 110. With reference to FIG. 7, one of posts 116 is shown in various positions within one of interfaces 150. In particular, post 116 is shown at various initial positions P0, an intermediate mounting position P1, a seated position P2 and an intermediate dismounting position P3 in FIG. 7. Movement of post 116 within interface 150 during mounting and dismounting of filter cartridge 130 on manifold 110 is discussed in greater detail below in the context of FIG. 7.

As shown in FIG. 7, sloped inlet surface 160 is positioned and/or oriented for guiding a respective one of posts 116 towards cupped support surface 170 as filter cartridge 130 is mounted to manifold 110. In particular, a user may push filter cartridge 130 into manifold 110 along the axial direction A such that post 116 enters interface 150 at any one of the initial positions P0. As the user continues to push filter cartridge 130 into manifold 110, support ring 114 rotates within base 112 of manifold 110 until post 116 is positioned at the intermediate mounting position P1. In particular, post 116 may slide along sloped inlet surface 160 (or an inlet surface of 170) from one of the initial positions P0 to the intermediate mounting position P1.

Post 116 is positioned on cupped stop portion 166 in the intermediate mounting position P1. The intermediate mounting position P1 may be a local extremum for the second portion 164 of sloped inlet surface 160, e.g., along the axial direction A. Thus, the intermediate mounting position P1 may correspond to a position of post 116 at maximum insertion of filter cartridge 130 into manifold 110 during installation of filter cartridge 130 into manifold 110.

At the intermediate mounting position P1, the user releases filter cartridge 130 and/or pulls filter cartridge 130 away from manifold 110 in order to move post 116 from the intermediate mounting position P1 to the seated position P2. As shown in FIG. 7, the post 116 is positioned on the cupped support surface 170 in the seated position P2. The seated position P2 may be a local extremum for cupped support surface 170, e.g., along the axial direction A. Thus, a location of post 116 may be stable on cupped support surface 170 at the seated position P2. The seated position P2 corresponds to the position of post 116 when filter cartridge 130 is mounted to manifold 110 and filter assembly 100 is operable to filter water. Each post of posts 116 is positioned on a respective cupped support surface 170 of interfaces 150 when filter cartridge 130 is mounted to manifold 110.

As described above, a user may mount filter cartridge 130 to manifold 110 by pushing filter cartridge 130 into manifold 110 such that post 116 moves from one of the initial positions P0 to the intermediate mounting position P1 and then to the seated position P2. Because support ring 114 rotates within base 112 of manifold 110, a user may not be required to rotate filter cartridge 130 relative to manifold 110 in order to move post 116 from one of the initial positions P0 to the intermediate mounting position P1. Rather, the user may simply push filter cartridge 130 into manifold 110 along the axial direction A.

To remove filter cartridge 130 from manifold 110, a user may push filter cartridge 130 into manifold 110 along the axial direction A such that post 116 moves from the seated position P2 to the intermediate dismounting position P3. In particular, post 116 may slide along sloped outlet surface 180 to the intermediate dismounting position P3. Support ring 114 rotates within base 112 of manifold 110 as post 116 moves towards the intermediate dismounting position P3. The intermediate dismounting position P3 may be a local extremum for the second portion 184 of sloped outlet surface 180, e.g., along the axial direction A. Thus, the intermediate dismounting position P3 may also correspond to a position of post 116 at maximum insertion of filter cartridge 130 into manifold 110 during removal of filter cartridge 130 from manifold 110.

At the intermediate dismounting position P3, the user releases filter cartridge 130 and/or pulls filter cartridge 130 away from manifold 110 in order to move post 116 from the intermediate dismounting position P3 back towards the initial position P0 closest to sloped outlet surface 180. Thus, post 116 may slide along sloped outlet surface 180 from the intermediate dismounting position P3 back to one of the initial positions P0 during removal of filter cartridge 130 from manifold 110.

As described above, a user may dismount filter cartridge 130 from manifold 110 by pushing filter cartridge 130 into manifold 110 such that post 116 moves from the seated position P2 to the intermediate dismounting position P3 and then back to one of the initial positions P0. Because support ring 114 rotates within base 112 of manifold 110, a user may not be required to rotate filter cartridge 130 relative to manifold 110 in order to move post 116 from the seated position P2 to the intermediate dismounting position P3 and then back to one of the initial positions P0. Rather, the user may simply push filter cartridge 130 into manifold 110 along the axial direction A.

As may be seen from the above, filter assembly 100 may be configured such that filter cartridge 130 is installed by pushing filter cartridge 130 into manifold 110, and filter assembly 100 may also be configured such that filter cartridge 130 is removed by pushing filter cartridge 130 into manifold 110. Thus, filter cartridge 130 may be easily and quickly installed in and/or removed from manifold 110. In addition, as discussed above, such connection between filter cartridge 130 and manifold 110 may permit a pleasant cosmetic appearance for filter assembly 100, e.g., such that an outer surface 134 of filter cartridge 130 is flush with outer surface 18 of head body 12 (or another adjacent outer surface in which filer assembly 100 is installed), because the user need not grasp and rotate filter cartridge 130.

Turning back to FIG. 3, manifold 110 may also include a spring 190 disposed within base 112. Spring 190 may be compressed (e.g., along the axial direction A) when filter cartridge 130 is mounted to manifold 110 such that spring 190 urges and holds posts 116 against cupped support surfaces 170, e.g., at the seated position P2 discussed above. For example, spring 190 may urge post 116 from the intermediate mounting position P1 to the seated position P2 when a user stop pushing filter cartridge 130 into manifold 110 along the axial direction A. In certain exemplary embodiments, as shown in FIG. 3, spring 190 may extend and be compressed between manifold 110 and filter cartridge 130. Spring 190 may be a helical coil spring, a torsion spring or any other suitable elastically deforming biasing element.

It will be understood that filter assembly 100 illustrated in FIGS. 1-6 is provided by way of example only. In alternative exemplary embodiment, the position of posts 116 and interfaces 150 may be switched. Thus, e.g., posts 116 may be positioned on, e.g., formed with, filter cartridge 130, and interfaces 150 may be positioned or formed on manifold 110. In particular, posts 116 may extend outwardly along the radial direction R from outer surface 134 of filter cartridge 130, and interfaces 150 may be positioned or formed on support ring 114 of manifold 110. The operation of and engagement between posts 116 and interfaces 150 is identical to that described above. As another example, posts 116 may be fixed on manifold 110, and interfaces 150 may be rotatable on filter cartridge 130. Thus, filter cartridge 130 may include a support ring (not shown) like support ring 114 of manifold 110 that is rotatable relative to housing 132, and interfaces 150 may be formed on the support ring of filter cartridge 130 in order to allow filter cartridge 130 to be installed and/or removed by pushing filter cartridge 130 into manifold 110. Posts 116 may be rotatable on manifold 110, and interfaces 150 may be rotatable on filter cartridge 130, in other exemplary embodiments. Mixtures of the above described positions for posts 116 and interfaces 150 are also within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A filter assembly, comprising:
 a manifold comprising a base and a support ring, the support ring received within the base, the support ring having a plurality of posts, the posts of the plurality of posts spaced apart from one another on the support ring;

a filter cartridge mountable to the manifold and defining an axial direction and a circumferential direction, the filter cartridge comprising a housing, the housing having a plurality of interfaces positioned at an outer surface of the housing, each interface of the plurality of interfaces configured to engage with a respective one of the plurality of posts in order to mount the filter cartridge to the manifold, each interface of the plurality of interfaces having a sloped inlet surface and a cupped support surface, the sloped inlet surface and the cupped support surface facing each other along the axial direction, a first portion of the sloped inlet surface offset from the cupped support surface along the circumferential direction, a second portion of the sloped inlet surface aligned with the cupped support surface along the circumferential direction, each post of the plurality of posts positioned on a respective cupped support surface of the plurality of interfaces when the filter cartridge is mounted to the manifold, wherein the support ring is received within the base such that the support ring is rotatable relative to the base, wherein each interface of the plurality of interfaces also has a sloped outlet surface, a first portion of the sloped outlet surface aligned with the cupped support surface along the axial direction, a second portion of the sloped outlet surface offset from the cupped support surface along the circumferential direction, and wherein a third portion of the sloped outlet surface is aligned with the cupped support surface along the axial direction, at least a portion of the cupped support surface positioned between the first and third portions of the sloped outlet surface along the axial direction, the second portion of the sloped outlet surface extending between the first and third portions of the sloped outlet surface.

2. The filter assembly of claim 1, wherein the manifold comprises a spring disposed within the base, the spring compressed when the filter cartridge is mounted to the manifold such that the spring urges each post of the plurality of posts against the respective cupped support surface of the plurality of interfaces.

3. The filter assembly of claim 1, wherein each post of the plurality of posts has a length along the axial direction, the second portion of the sloped inlet surface is spaced apart from the cupped support surface along the axial direction by no less than the length of the plurality of posts.

4. The filter assembly of claim 1, wherein the second portion of the sloped inlet surface comprises a cupped stop portion.

5. The filter assembly of claim 1, wherein the third portion of the sloped outlet surface is parallel to the first portion of the sloped inlet surface.

6. The filter assembly of claim 1, wherein the posts of the plurality of posts are uniformly spaced apart from one another on the support ring.

7. The filter assembly of claim 1, wherein the base of the manifold comprises a first base section and a second base section, the first base section mounted to the second base section such that the first and second base sections define an annular space, the support ring received within the annular space.

8. The filter assembly of claim 1, wherein the manifold is positioned within a shower head.

9. A filter assembly, comprising:

a manifold comprising a base and a support ring, the support ring received within the base, the support ring having a post;

a filter cartridge mountable to the manifold and defining an axial direction and a circumferential direction, the filter cartridge comprising a housing, the housing having an interface positioned at an outer surface of the housing, the interface configured to engage with the post in order to mount the filter cartridge to the manifold, the interface having a sloped inlet surface and a cupped support surface, the sloped inlet surface and the cupped support surface facing each other along the axial direction, a first portion of the sloped inlet surface offset from the cupped support surface along the circumferential direction, a second portion of the sloped inlet surface aligned with the cupped support surface along the circumferential direction, the sloped inlet surface positioned and oriented for guiding the post to the cupped support surface as the filter cartridge is mounted to the manifold, the post positioned on the cupped support surface when the filter cartridge is mounted to the manifold, wherein the support ring is received within the base such that the support ring is rotatable relative to the base, wherein the interface also has a sloped outlet surface, a first portion of the sloped outlet surface aligned with the cupped support surface along the axial direction, a second portion of the sloped outlet surface offset from the cupped support surface along the circumferential direction, and wherein a third portion of the sloped outlet surface is aligned with the cupped support surface along the axial direction, at least a portion of the cupped support surface positioned between the first and third portions of the sloped outlet surface along the axial direction, the second portion of the sloped outlet surface extending between the first and third portions of the sloped outlet surface.

10. The filter assembly of claim 9, wherein the manifold comprises a spring disposed within the base, the spring compressed when the filter cartridge is mounted to the manifold such that the spring urges the post against the cupped support surface.

11. The filter assembly of claim 9, wherein the post has a length along the axial direction, the second portion of the sloped inlet surface spaced apart from the cupped support surface along the axial direction by no less than the length of the post.

12. The filter assembly of claim 9, wherein the second portion of the sloped inlet surface comprises a cupped stop portion.

13. The filter assembly of claim 9, wherein the third portion of the sloped outlet surface is parallel to the first portion of the sloped inlet surface.

14. The filter assembly of claim 9, wherein the base of the manifold comprises a first base section and a second base section, the first base section mounted to the second base section such that the first and second base sections define an annular space, the support ring received within the annular space.

15. The filter assembly of claim 9, wherein the manifold is positioned within a shower head.

16. A filter assembly defining an axial direction and a circumferential direction, the filter assembly comprising:

a manifold comprising a base and a support ring, the support ring received within the base such that the support ring is rotatable relative to the base; and a filter cartridge having a housing, wherein the filter cartridge is mountable to the manifold at a connection between the filter cartridge and the manifold, the connection between the filter cartridge and the manifold comprising a post and an interface, the post positioned on one of the support ring or the housing of the filter cartridge, the interface positioned on the other of the support ring or the housing of the filter cartridge, the interface configured to engage with the post in order to mount the filter cartridge to the manifold, the interface having a sloped inlet surface and a cupped support surface, the sloped inlet surface and the cupped support surface facing each other along the axial direction, a first portion of the sloped inlet surface offset from the cupped support surface along the circumferential direction, a second portion of the sloped inlet surface aligned with the cupped support surface along the circumferential direction, the sloped inlet surface positioned and oriented for guiding the post to the cupped support surface as the filter cartridge is mounted to the manifold, the post positioned on the cupped support surface when the filter cartridge is mounted to the manifold, wherein the interface also has a sloped outlet surface, a first portion of the sloped outlet surface aligned with the cupped support surface along the axial direction, a second portion of the sloped outlet surface offset from the cupped support surface along the circumferential direction, and wherein a third portion of the sloped outlet surface is aligned with the cupped support surface along the axial direction, at least a portion of the cupped support surface positioned between the first and third portions of the sloped outlet surface along the axial direction, the second portion of the sloped outlet surface extending between the first and third portions of the sloped outlet surface.

17. The filter assembly of claim 16, wherein the post is positioned on the support ring such that the post extends along a radial direction from the support ring, the interface positioned on the housing of the filter cartridge at an outer surface of the housing.

18. The filter assembly of claim 16, wherein the post is positioned on the housing of the filter cartridge such that the post extends along a radial direction from an outer surface of the housing, the interface positioned on the support ring.

19. A filter cartridge mountable to a manifold, the filter cartridge defining an axial direction and a circumferential direction, the filter cartridge comprising:
  a housing extending between a first end portion and a second end portion along the axial direction;
  a plurality of interfaces formed at an outer surface of the housing adjacent the first end portion of the housing, each interface of the plurality of interfaces having a sloped inlet surface and a cupped support surface, the sloped inlet surface facing the first end portion of the housing, the cupped support surface facing the second end portion of the housing, a first portion of the sloped inlet surface offset from the cupped support surface along the circumferential direction, a second portion of the sloped inlet surface aligned with the cupped support surface along the circumferential direction, each interface of the plurality of interfaces also having a sloped outlet surface, a first portion of the sloped outlet surface aligned with the cupped support surface along the axial direction, a second portion of the sloped outlet surface offset from the cupped support surface along the circumferential direction, a third portion of the sloped outlet surface aligned with the cupped support surface along the axial direction, at least a portion of the cupped support surface positioned between the first and third portions of the sloped outlet surface along the axial direction, the second portion of the sloped outlet surface extending between the first and third portions of the sloped outlet surface.

* * * * *